United States Patent [19]

Meyke et al.

[11] Patent Number: 5,064,587
[45] Date of Patent: Nov. 12, 1991

[54] METHOD FOR EXTRUDING A THERMOPLASTIC PLASTICS MATERIAL FOAM

[75] Inventors: Joachim Meyke; Gerhard Martin, both of Hanover, Fed. Rep. of Germany

[73] Assignee: Hermann Berstorff Maschinenbau GmbH, Hanover, Fed. Rep. of Germany

[21] Appl. No.: 541,380

[22] Filed: Jun. 21, 1990

[30] Foreign Application Priority Data

Jun. 30, 1989 [DE] Fed. Rep. of Germany ....... 3921523

[51] Int. Cl.$^5$ .............................................. B29C 47/00
[52] U.S. Cl. .................................. 264/50; 264/211.23; 264/DIG. 5
[58] Field of Search ................. 264/45.9, 50, 51, 53, 264/211.23, DIG. 5

[56] References Cited

U.S. PATENT DOCUMENTS

| 4,424,287 | 1/1984 | Johnson et al. | 264/53 |
| 4,438,224 | 3/1984 | Suh et al. | 264/53 |
| 4,470,938 | 9/1984 | Johnson | 425/4 C |
| 4,548,776 | 10/1985 | Holdredge, Jr. | 264/50 |
| 4,636,527 | 1/1987 | Suh et al. | 264/50 |
| 4,753,762 | 6/1988 | Li et al. | 264/54 |

Primary Examiner—Jan H. Silbaugh
Assistant Examiner—Brian J. Eastley
Attorney, Agent, or Firm—Foley & Lardner

[57] ABSTRACT

A method of extruding a foamed thermoplastic plastics material wherein the thermoplastic plastics material, together with a pore regulating agent, is introduced into an extruder and is fused. Gaseous nitrogen, in an amount of 0.2% to 0.5% by weight, and an incompletely halo-substituted hydrocarbon, in an amount of from 0.5% to 2% by weight, are sequentially injected into the fused mixture. The injected material then enters an extrusion head in which the mixture is maintained at a pressure in excess of 55 bar and the temperature thereof is maintained above a temperature pre-determined in dependence upon the nature of the plastics material. The material foams as it leaves the extrusion head.

1 Claim, 1 Drawing Sheet

5,064,587

METHOD FOR EXTRUDING A THERMOPLASTIC PLASTICS MATERIAL FOAM

FIELD OF THE INVENTION

The present invention relates to a method and to an apparatus for extruding a thermoplastic plastics material foam. More particularly the present invention relates to a method for extruding a thermoplastic plastics material foam formed from a thermoplastic plastics material and a pore regulating substance in which these materials are fused, mixed and homogenised in an extrusion device and into which two different propellants are injected into the fused mixture. The present invention also relates to an extrusion device suitable for carrying out such a method.

BACKGROUND OF THE INVENTION AND PRIOR ART DISCUSSION

Extruded foam products have been known for a long time. Initially, combustible propellants were used in the manufacture of such products. An early breakthrough in the production of such foams was the use of chlorofluorohydrocarbons (CFC) as the propellants instead of the combustible propellants. Pentane had also been used as propellant. Once CFC compounds trichlorofluoromethane, dichlorodifluoromethane, trichlorotrifluoroethane and dichlorotetrafluoroethane started to be used in foam extrusion processes, semi-finished articles and products could be produced which met the market demands in respect of both quality and operational use.

However, it has recently been ascertained that CFC gases, which are heavily used in aerosol and refrigeration technology and in the electronics industry, substantially accelerate the destruction of the ozone layer in the upper atmosphere of the earth. Accordingly, there has recently been a return to the use of pentane as a propellant because, although it is slightly inflammable, it does not damage the ozone layer.

In general, the extrusion devices which are to be used to produce foams do not differ substantially from conventional extrusion devices. However, metering systems for the addition of the propellant must be used to ensure that the propellant cannot escape due to wear in the pressure build-up system of the pump for the propellant. If such escape occurred, the risk of fire would be considerably increased. In addition, it is advisable for the propellant metering systems to be separate from the extrusion device. Further, safety measures which are essential are intensive ventilation in the form of air renewal in the location where the foam extrusion device is installed, in the intermediate film layer, in the deep-drawing section and in the section where the foam waste is re-extruded. It is also necessary to provide means for removing electrostatic charge from the semi-finished foam articles and products.

In consequence, specific demands are made of the propellant when, particularly, foamed polystyrene is being produced by extrusion. The propellant must be soluble in the fused mass of polystyrene, but its viscosity and its glass point must not be significantly changed. During the foaming, the propellant must have a high rate of evaporation, so that the concentration of residual gas remains minimal. No permeation of the propellant can be permitted because this would cause the foamed cells to collapse before they had time to harden. Propellants which have these properties and have been used in practice include pentane, trichlorofluoromethane, dichlorodifluoromethane and, in exceptional cases, nitrogen.

Nitrogen can be successfully used as the propellant when a sufficiently high concentration of solution can be achieved. However, in prior art systems, this could only be achieved by providing a large quantity of metering machines, which is not feasible. The slight affinity of nitrogen for the fused mass of polystyrene necessitates the use of a very high solution pressure, which is substantially higher than that necessary if dichlorodifluoromethane is used.

OBJECTS OF THE INVENTION

The present invention seeks to provide a method for producing thermoplastic plastics material foams using propellants which have good foaming properties, are not fire hazards and which cause negligible damage to the ozone layer.

The propellant itself should produce materials of very low foam densities, in order to be of low weight if the foam is intended for use as packaging and in order to permit the use of the minimum possible amount of relatively expensive plastics material.

SUMMARY OF THE INVENTION

According to the present invention, there is provided a method of producing a foamed thermoplastic plastics material by extrusion comprising the steps of admixing a plastics material with a pore regulating agent, introducing said mixture into an extrusion device, fusing, mixing and homogenising said mixture in said extrusion device, injecting a first propellant in the form of gaseous nitrogen into said homogenised mixture in said extrusion device in an amount of rom 0.2% to 0.5% by weight relative to the combined weight of the plastics material and pore regulating agent, further mixing and homogenising said mixture and said nitrogen in said extrusion device to form an homogenized nitrogen-containing mixture, injecting a second propellant in the form of a liquid incompletely halo-substituted, hydrocarbon into said homogenised nitrogen-containing mixture, said second propellant being introduced in an amount of from 0.5% to 2% by weight of the combined weight of said plastics material and pore regulating agent, further mixing and homogenising said mixture of said plastics material, pore-regulating agent and propellants in said extrusion device, and extruding said mixture of plastics material, pore-regulating agent and propellants through an extrusion head whereby foaming of the plastics material occurs, wherein the pressure of the mixture of plastics material, pore regulating agent and propellants in said extrusion head is maintained in excess of 55 bar, and wherein the temperature of said mixture in said extrusion head is maintained at or above a temperature of 122° C. dependent upon the plastics material employed.

Also according to the present invention, there is provided an extrusion device for producing a foamed thermoplastic plastics material comprising a cylindrical housing, said housing including opposed first and second end regions defining a hollow interior, screw means mounted for rotation within said hollow interior, drive means for rotating said screw, feed means disposed in said first end region of said housing for introducing said plastics material into said hollow interior of said housing, an extrusion head disposed in said second end region for extruding said plastics material to form a foam and first and second injection zones defined within said hollow interior of said housing, first injection means communicating with said first injection zone for injecting a gaseous propellant into said first injection zone and second injection means communicating with said second injection zone for injecting a liquid propellant into said second injection zone, wherein said first injection zone is disposed upstream of said second injection zone means and said first and second injection means are spaced from one another by a distance which is at least equal to twice the diameter of said screw.

In a surprising and totally unexpected manner, it has been found that the injection of the two different propellants, that is to said 0.2% to 0.5% by weight gaseous nitrogen and 0.5% to 2% by weight of an incompletely halo-substituted hydrocarbon, the percentages by weight being the combined weight of the plastics material to be foamed and a pore regulating agent such as talc, permits a foam having an extremely low density to be formed.

The spacing between the injection zones in the extrusion device is particularly advantageous because it permits optimum homogeneous mixing of the gaseous propellant with the fused material. In a totally unexpected manner, further enriching the fused mass of plastics material and gaseous propellant with more propellant can be achieved if a liquid propellant is used because no disadvantageous effects, such as separation, occur when the liquid propellant is added to the material.

BRIEF DESCRIPTION OF THE DRAWINGS

One embodiment of an extrusion device in accordance with the present invention will be further described, by way of example, with reference to the accompanying drawings, in which.

DETAILED DESCRIPTION OF THE PREFERRED EMBODIMENTS

Figure 1:
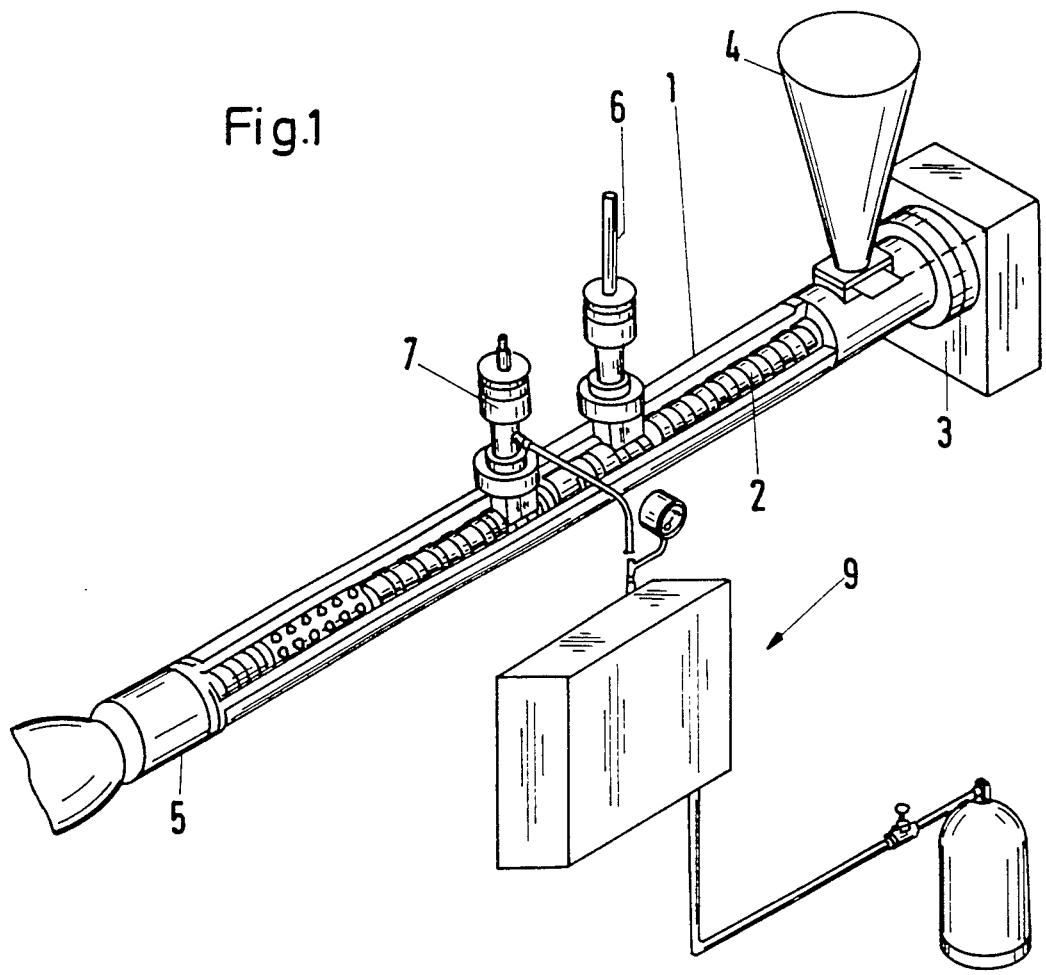
FIG. 1 is a perspective view of the extrusion device.
Figure 2:
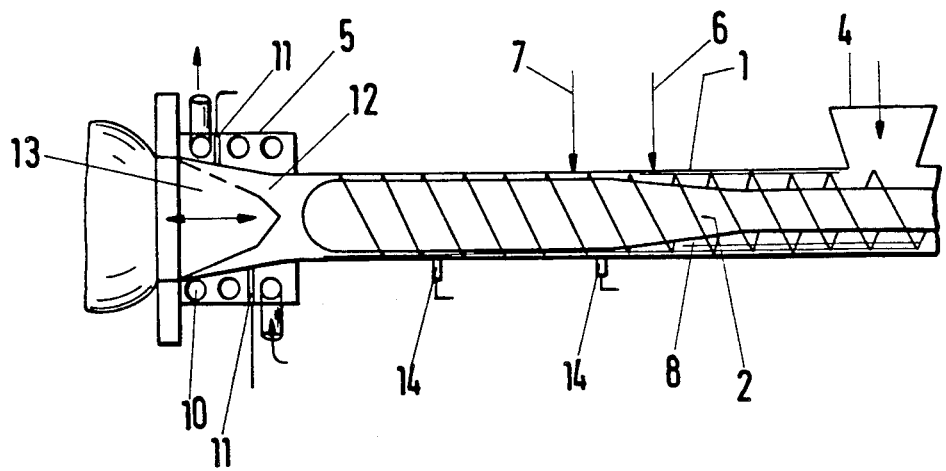
FIG. 2 is a schematic, longitudinal sectional view of the extrusion device shown in FIG. 1.

In FIG. 1 of the drawings, there is shown an extrusion device 1 which comprises a screw 2 rotatable in a hollow barrel. The screw is rotated by means of a drive and transmission unit 3. The thermoplastic plastics material to be foamed, in this embodiment a mixture of polystyrene, is introduced through a feed hopper 4 into the barrel and is conveyed by the screw in the direction of the extrusion head 5.

Gaseous nitrogen is injected into the extrusion chamber 8, that is to say, the hollow interior of the barrel, through a first propellant injection nozzle 6, and chlorodifluoromethane, in liquid form, is injected into the extrusion chamber 8 through a second injection nozzle 7 at a pressure which is in excess of that subsisting in the chamber 8. The axial spacing of the nozzles 6 and 7 from one another is at least twice the diameter of the screw 2. Metering devices 9, known per se are used for metering both the nitrogen and the chlorodifluoromethane.

Temperature control conduits 10 are provided in the extrusion head. These conduits communicate with a temperature controlling device which is well known and therefore not shown.

The extrusion head 5 defines a chamber 12 and the pressure therein is measured by means of pressure sensors 11. The pressure in chamber 12 is dependent upon the configuration of the flow conduits entering and leaving the head and upon the location of a mandrel 13 over which the extruded material is caused to flow. The mandrel 13 is axially adjustable in the direction of the double-headed arrow and the configuration of the flow conduits can be selected as desired by the circumstances of the extrusion. The pressure in the extrusion chamber 8 is also detected by means of pressure sensors 14 and the values obtained can be used as necessary.

The invention will be further described, by way of illustration, with reference to some non-limitative Examples. Such Examples illustrate the production of thermoplastic plastics material foams utilising a device as described hereinbefore with reference to the accompanying drawings. Examples 1 and 2 illustrate known methods of producing foams while Examples 3 through 12 illustrate methods of producing foams utilizing both gaseous nitrogen and a liquid, incompletely halo-substituted, hydrocarbon as propellants. In these latter Examples, the pressure in the extrusion chamber 8, in the region of the injection nozzles 6 and 7, was maintained within the range of from about 150 to about 350 bar and the pressure at the downstream end of the screw 2 was maintained in the range of from about 100 bar to about 200 bar. The pressure of the mixture of plastics material and propellant in the extrusion head 5 was maintained at above 55 bar, usually within the range of from about 80 to about 180 bar. If such a pressure is not maintained in the extrusion head, the degree of foaming of the film which is produced is unsatisfactory.

The maximum temperature attained by the mixture in the device 1 was 240° C., which is the temperature in the extrusion chamber 8 in the region of the injection nozzles 6 and 7. The temperature was then set to not less than 130° C. in the region of the downstream end of the screw if the plastics material is polystyrene or not less than 122° C. if the plastics material is polyethylene. If the temperature is reduced to below this value, the quality of the foam which is produced is unacceptable.

EXAMPLE 1

(Prior Art)

Polystyrene (99.5 kg) is mixed with talc (0.5 kg) which acts as a pore regulating substance. The mixture was introduced, in metered amounts, into an extrusion device of the type shown in FIG. 1, and was fused.

Gaseous nitrogen (0.3% by weight having a gaseous volume of 0.327 m$^3$) was introduced, in metered amounts, into the fused mass of polystyrene and talc through the injection nozzle 6 and was homogeneously mixed therewith. The mixture was then extruded to form a hose. The foamed hose thus produced had a wall thickness of 1 mm but a density of 350 kg/m$^3$. Such density is excessively high and means that the field of use of the material is severely limited.

EXAMPLE 2

(Prior Art)

The procedure set forth in Example 1 hereinbefore was followed except that the amount of nitrogen used was increased to 0.5% by weight (a gas volume of 0.545 m$^3$). The density of the hose was thereby reduced to 200 kg/m$^3$ and the hose had a wall thickness of 2 mm. These values are still too high to permit widescale use of the foamed material.

Attempts were made to increase the nitrogen content still further. However, the density rapidly deteriorated, probably due to the plastics material being saturated with propellant, that is to say, the plastics material could not absorb any more propellant.

EXAMPLE 3

(According to the Invention)

As before, polystyrene (99.5 kg) in granular form together with talc (0.5 kg) were introduced in a metered manner into an extrusion device and fused.

Gaseous nitrogen (0.5% by weight) which produces a gas volume of approximately 0.545 m$^3$ at 373° K. and constitutes up to 61% of the volume of the total amount of propellant (1.5% by weight) was introduced, in a metered manner, into the fused mass.

Subsequently, liquid chlorodifluoromethane (1% by weight) which produces a gas volume of 0.355m$^3$ at 373° K. and makes up 39% of the volume of the total amount of propellant, was introduced in a metered manner into a section of the extrusion device downstream of the section in which the nitrogen was introduced. The chlorodifluoromethane was homogeneously mixed with the fused mass.

A pressure of 60 bar for the mixture of material and propellants was set in the extrusion head by suitably axially adjusting the mandrel 13 and by appropriately configuring the flow conduits in the extrusion head 5.

A temperature of 163° C. was maintained for the mixture of material and propellant in the head by utilizing an oil, temperature-controlling device.

The mixture was then extruded to form a hose, which was cut open and laid flat. The hose thickness was 1.5 mm. A density of 161 kg/m$^3$ was achieved, and this is regarded as a feasible value for many applications of use of foamed polystyrene.

It was ascertained, by additional tests, that the temperature in the head could be reduced to not lower than 122° C. if polyethylene was used instead of polystyrene. Such lower temperature did not noticeably affect the nature of the foam produced.

EXAMPLE 4

(According to the Invention)

The procedure described in Example 3 hereinabove was repeated, except that 1.5% by weight of liquid chlorodifluoromethane, which has a gas volume of 0.532 m$^3$ at 373° K., was used. This represents 49% of the total volume of the gaseous propellant the total weight percentage of propellant, being 2%. The wall thickness of the foamed material was 1.7 mm, but the density was 132 kg/m$^3$. This density is extremely acceptable.

EXAMPLE 5

(According to the Invention)

The procedure described in Example 3, hereinabove was further repeated except that the weight of chlorodifluoromethane was again increased.

2% by weight of liquid chlorodifluoromethane, having a gas volume of 0.710 m$^3$ at 373° K. and corresponding to 57% of the total gas volume of propellant was introduced, in a metered manner into the fused mixture. The total weight percentage of the two propellants was 2.5%.

The wall thickness of the foam web thus produced was 2 mm. The density of the web was 90 kg/m$^3$, which is to be regarded as an extremely good value. This procedure represented the upper limits for both propellants in a method in accordance with the present invention.

EXAMPLE 6

The procedure described in Example 5 was repeated, with the exception that 0.5% by weight chlorodifluoromethane, producing a gas volume of approximately 0.177 m$^3$ at 373° K., was used. This represents 25% of the total gas volume of the total amount of propellant. The total percentage by weight of the propellants was 1% and these were introduced into the fused mass in a metered manner.

The thickness of the foam film was 1.5 mm. Its density was 145 kg/m$^3$. The amounts of the propellants represent the maximum percentage of nitrogen and the minimum percentage of chlorodifluoromethane permitted by the present invention.

EXAMPLE 7

The procedure described in Example 5, was further repeated, with the exception that 0.2% by weight of nitrogen having a gas volume of 0.218 m$^3$ at 373° K., representing 24% of the total gas volume of the propellants, was introduced into the fused mass in a metered manner. The percentage by weight of the two propellants was 2.2%. These amounts represent the minimum amount of nitrogen and the maximum amount of chlorodifluoromethane permitted by the present invention.

The wall thickness of the foamed material was 1.4 mm, and its density was 180 kg/m$^3$.

EXAMPLE 8

The procedure described in Example 7 was repeated with the exception that the amount of chlorodifluoromethane was reduced to a percentage of 0.5% by weight. This represents a gas volume of 0.177 m$^3$ at 373° K., and corresponds to a proportion of 45% of the total gas volume of the total amount of propellant. The total percentage of propellants by weight was 0.7% and the propellants were again introduced into the fused mass in a metered manner.

A very heavy foam which was both hard and brittle was produced. It had a wall thickness of 0.7 mm and a density of about 500 kg/m$^3$.

EXAMPLE 9

(According to the Invention)

The procedure as described in Example 3 was repeated, with the exception of the introduction, in a metered manner, of liquid dichlorotrifluoroethane (1.0 kg; 1% by weight which produces a gas volume of approximately 0.200 m$^3$ at 373° K). Such gas constituted 27% of the total gas volume of the total amount of propellant which was 1.5% by weight.

The wall thickness of the foamed material produced was 1.3 mm, and the density thereof was 160 kg/m$^3$. The foam was generally somewhat harder and more brittle than produced by the procedure described in Example 3.

EXAMPLE 10

(According to the Invention)

The procedure described in Example 3 was repeated except that liquid tetrafluoroethane ($CH_2F$-$CH_3$) was used. 1.0 kg (1% by weight) of such propellant was used, which produces a gas volume of approximately 0.301 m$^3$ at 373° K., forming 35% of the total gas volume of the total amount of propellant. The total percentage by weight of the propellant was 1.5%.

The wall thickness of the foamed material produced was 1.5 mm and the density thereof was 148 kg/m$^3$. This can be regarded as a good value.

EXAMPLE 11

(According to the Invention)

The procedure described in Example 3 was repeated yet again with the exception that liquid dichloromonofluoroethane (CH$_3$-CCl$_2$F) was used instead of chlorodifluoromethane. 1.0 kg (1% by weight) of such propellant was used. This produces a gas volume of approximately 0.263 m$^3$ at 373° K. and constitutes 33% of the total gas volume of the total amount of propellant. The total percentage by weight of the propellant was again 1.5%.

The wall thickness of the foamed material thus produced was 1.4 mm and the density thereof was 155 kg/m$^3$. The foam quality is similar to that produced in Example 3 but the density is improved compared with such previous Example.

EXAMPLE 12

(According to the Invention)

The procedure described in Example 3 was repeated once more, this time using liquid difluoromonochloroethane as the propellant 1.0 kg (1% by weight) of such propellant was introduced into the fused mass in a metered manner. The propellant produces a gas volume of approximately 0.304 m$^3$ at 373° K. which constitutes 36% of the total gas volume of the total amount of propellant. The percentage by weight of the propellants was again 1.5%.

The wall thickness of the foamed material thus produced was 1.6 mm and the density thereof was 155 kg/m$^3$. This is to be regarded as a good value.

We claim:

1. A method of producing a foamed thermoplastic plastics material by extrusion comprising the steps of:
   a) admixing a plastics material with a pore regulating agent, said plastics material being selected from the group consisting of polystyrene and polyethylene,
   b) introducing said mixture into an extrusion device,
   c) fusing, mixing and homogenising said mixture in said extrusion device,
   d) injecting a first propellant in the form of gaseous nitrogen into said homogenised mixture in said extrusion device in an amount of from 0.2% to 0.5% by weight relative to the combined weight of the plastics material and pore regulating agent,
   e) further mixing and homogenising said mixture and said nitrogen in said extrusion device to form an homogenised nitrogen-containing mixture,
   f) injecting a second propellant in the form of a liquid, incompletely halo-substituted, hydrocarbon into said homogenised nitrogen-containing mixture, said second propellant being introduced in an amount of from 0.5% to 2% by weight of the combined weight of said plastics material and pore regulating agent, said incompletely halo-substituted hydrocarbon being selected from the group consisting of chlorodifluoromethane, dichlorotrifluoroethane, tetrafluoroethane, dichlorofluoroethane and chlorodifluoroethane,
   g) further mixing and homogenising said mixture of said plastics material, pore regulating agent, and propellants in said extrusion device and extruding a mixture thereof through an extrusion head whereby foaming of the plastics material occurs, and
   wherein the pressure of the mixture of plastics material, pore regulating agent and propellants in said extrusion head is maintained in excess of 55 bar and the temperature of said mixture is maintained at or above a temperature of 122° C.

* * * * *